Nov. 12, 1940.    I. W. ROBERTSON    2,221,695
APPARATUS AND METHOD FOR MAKING THIN RUBBER ARTICLES
Filed Dec. 17, 1938    2 Sheets-Sheet 1
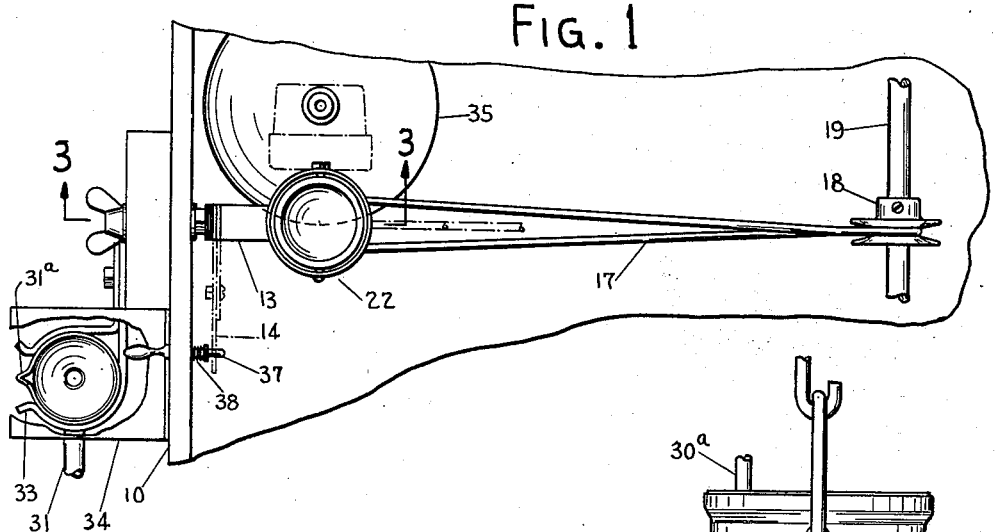
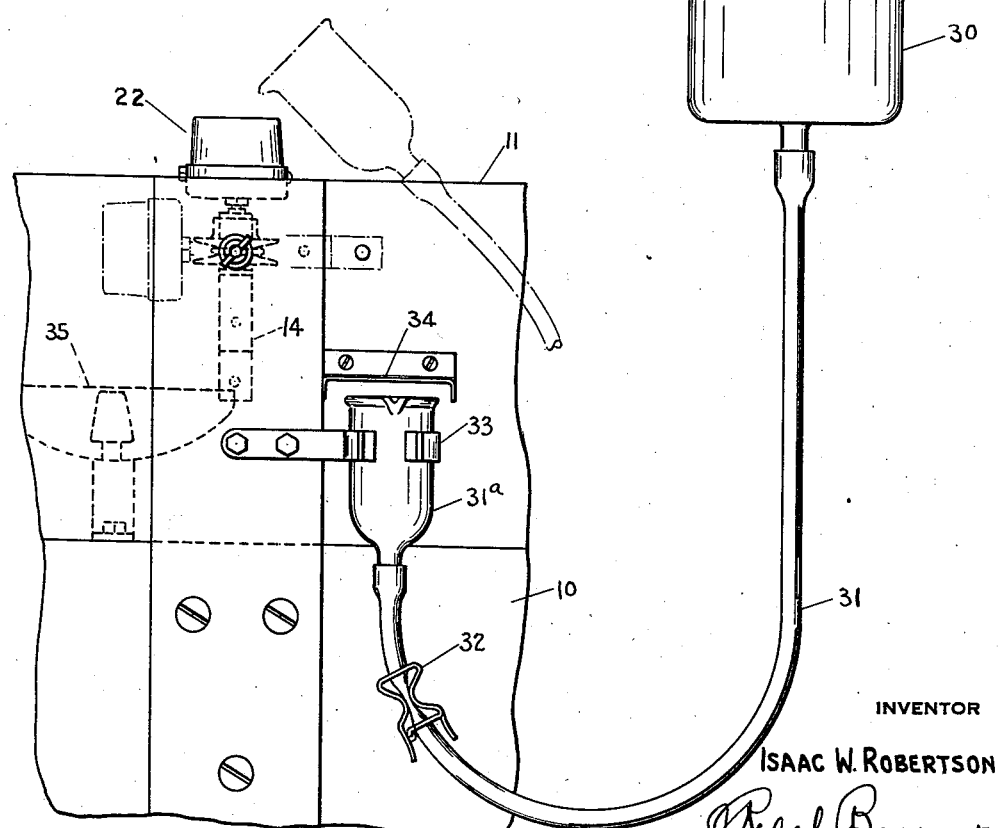
INVENTOR
ISAAC W. ROBERTSON
ATTORNEY Nov. 12, 1940.  I. W. ROBERTSON  2,221,695
APPARATUS AND METHOD FOR MAKING THIN RUBBER ARTICLES
Filed Dec. 17, 1938  2 Sheets-Sheet 2
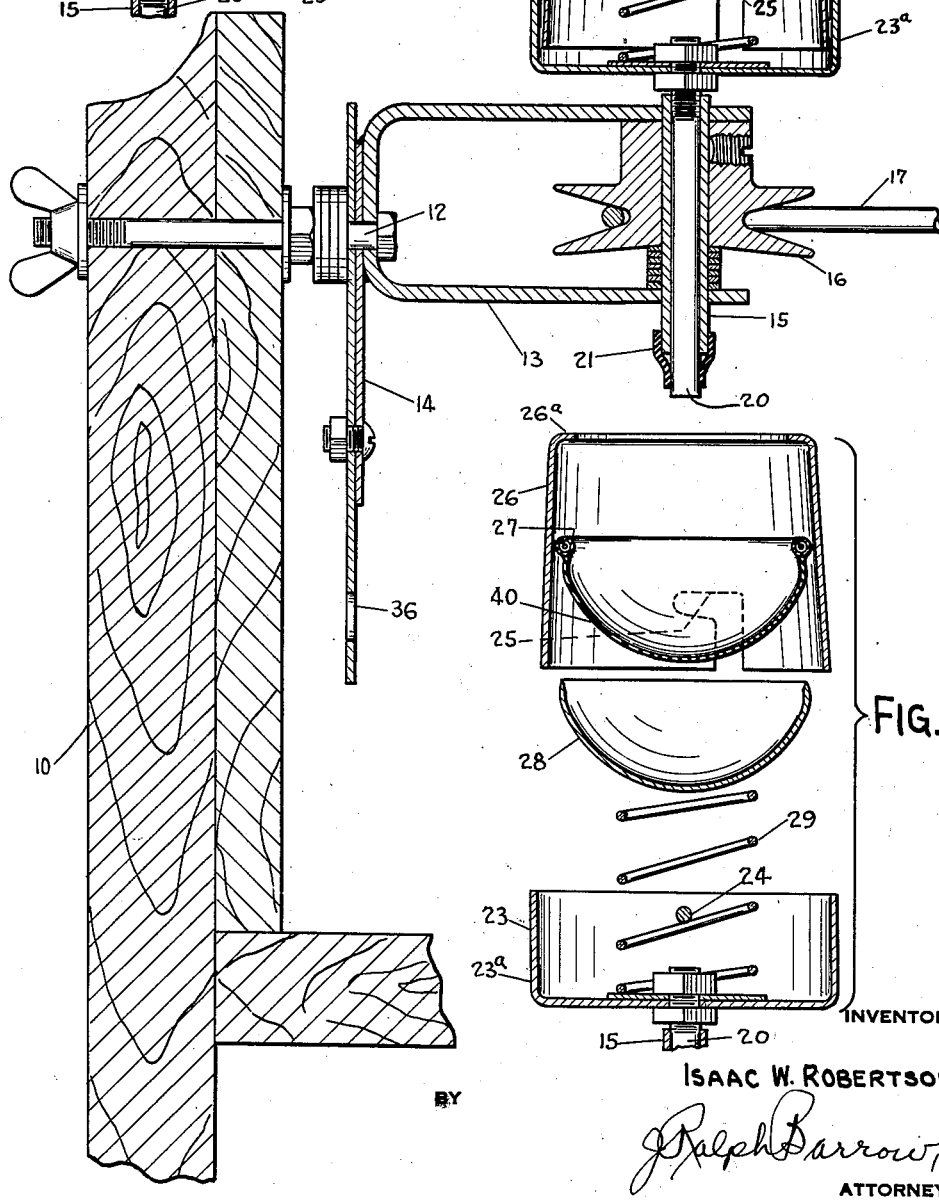
INVENTOR
ISAAC W. ROBERTSON
BY
Ralph Barrow,
ATTORNEY Patented Nov. 12, 1940

2,221,695

UNITED STATES PATENT OFFICE 2,221,695

APPARATUS AND METHOD FOR MAKING THIN RUBBER ARTICLES

Isaac W. Robertson, Los Angeles, Calif.

Application December 17, 1938, Serial No. 246,375

7 Claims. (Cl. 18—26)

This invention relates to apparatus and methods for making thin rubber articles, such as pessaries and the like.

The general object of the invention is to provide simple, economical apparatus and procedure for producing such articles, using rubber latex or other non-viscous solutions or suspensions of rubber or the like.

The foregoing and other objects of the invention will be manifest from the following brief description and the accompanying drawings.

Of the accompanying drawings:

Figure 1 is a plan view, partly broken away, illustrating one unit of the apparatus embodying the invention.

Figure 2 is a side elevation thereof, as viewed from the left of Figure 1.

Figure 3 is an enlarged cross-section taken on line 3—3 of Figure 1.

Figure 4 is a cross-section of the article forming head having an article formed therein.

Figure 5 is an explosion view of the parts shown in Figure 4.

Referring in particular to Figures 1, 2, and 3 of the drawings, the numeral 10 designates a suitable frame 11 for supporting one or more article forming units. Suitably journalled on a shaft 12 secured in frame 10 may be a U-shaped bracket 13, the latter having an arm 14 thereon preferably extending at right angles to the axis of shaft 12 for manually swinging bracket 12 on the shaft. It is understood that suitable automatic means (not shown) may be provided for performing this swinging movement.

Mounted in bracket 13 may be a sleeve 15 having a pulley 16 secured thereon adapted to be driven through a flexible belt 17 and a pulley 18 fixed on a shaft 19, by any suitable driving means (not shown). The sleeve 15 may be adapted to receive a shaft 20, the latter preferably being releasably locked to the sleeve to rotate therewith as by means of a removable band 21 to elastic material. Fixed on the upper end of shaft 20 (see Figure 3) is an article forming head, indicated generally at 22, which includes a cup-shaped base member 23 having a bayonet pin 24, extending between the annular up-turned flange 23ª thereof, adapted to be received in bayonet slots 25 of a hollow inverted conical casing 26.

The top edge of casing 26 may flange inwardly a short distance at 26ª for receiving thereunder the usual flexible reinforcing bead 27, which preferably is an annular coil spring having an outer coating of rubber either uncured or partly cured thereon, this bead being held in place against flange 26ª by means of a cup-shaped article forming receptacle 28 yieldingly urged against the bead by a compression spring 29 extending between receptacle 28 and base member 23. The spring 29 also is utilized yieldably to retain casing 26 in its bayonet connection with base member 23, and further serves to center the casing and parts associated therewith in alignment with the axis of shaft 20.

The top inside edge of receptacle 28 preferably is rounded outwardly to blend into the bead 27 so that the rubber will flow during the article forming process, subsequently to be described, to form an outer fillet between the formed article and its bead. The marginal portion of the receptacle may curve inwardly so that the rubber will flow to blend the inside surface of the article substantially tangential to the surface of the ring, as best shown in Figures 4 and 5.

Suitably supported above the article forming heads 22 may be a tank 30 for containing liquid rubber latex or the like, the tank having attached to the bottom thereof a flexible conduit 31 through which the latex flows by gravity to a pouring nozzle 31ª, a suitable pinch-cock or valve 32 being provided on the conduit to control such flow. Nozzle 31ª may be of such volume to allow exact measured amount of latex to be dropped therein by gravity upon opening valve 32 a sufficient length of time, the measured amount varying according to the wall thickness desired on the finished article. A holder 33 for releasably retaining nozzle 31ª in upright position when not in use may be conveniently located on the frame 10, and a cover 34 may be arranged over the nozzle to prevent foreign matter from falling into the mouth thereof.

The tank 30 preferably is fully enclosed and is provided at the top thereof with pipe 30ª, connected to a suitable suction pump (not shown), communicating with the space above the level of the latex in the tank. This arrangement draws off vapor and air and prevents formation of bubbles in the latex which would be likely to form defects on the goods.

Located directly under the article forming head 22, in the horizontal position thereof shown in chain-dotted lines in Figure 2, may be a heater 35. This preferably is an electric radiant type heater, arranged to set or dry the latex formed, or in the course of being formed, in the receptacle 28. For retaining the head 22 in horizontal position during the article forming operation arm 14 may be provided with an orifice 36 for receiving a stop pin 37 extending through frame 10 and yieldably held in extended position by a suitable spring arrangement 38.

In the use of the apparatus to form pessaries or like articles, the head 22 is first assembled as shown in Figure 3 with the usual bead 27 which is employed in such pessaries held securely against flange 26a by receptacle 28 and spring 29. With the head maintained in vertical position and slowly rotated through the driving connection to pulley 16, a measured amount of liquid latex is now poured into the receptacle 28, such amount depending on the thickness desired on the finished article. As the head continues to be rotated, the bracket 13 may be slowly tilted on shaft 12 to distribute the latex evenly over the inner surface of the receptacle 28. As the head approaches the horizontal position (see Figure 2) the latex flows about the rubberized surface of bead 27 and adheres thereto as the latex is set or dried to the shape of the receptacle 28. The drying process is hastened by application of heat from heater 35. This provides substantially thickened reinforcing portion where the body of the finished article joins the bead. The foregoing method makes it possible to bond the wall of the article to the bead radially of the surface thereof, without corners to harbor foreign matter.

It is understood that the tilting movement of the head 22 may be varied in accordance with the shape of receptacle 28 to obtain goods of uniform thickness. It has been found, for example, that satisfactory articles having smooth, uniform texture are obtainable for the present purposes, with the particular shape of receptacle 28 shown in the drawings, if the head 22 is maintained in horizontal position, while still rotating, during the drying process. Similarly, this movement may be varied to produce goods having uniformly relatively thickened areas according to requirements. The article 40 resulting from this procedure is best illustrated in Figures 4 and 5, Figure 5 being an explosion view of the cooperating parts of the head 22, shown assembled in Figure 4.

After the article has been formed and dried in receptacle 28, the head 22 may be taken apart by releasing the bayonet connection between retainer 26 and base 23, to permit removal of receptacle 28 with the article 40 therein and reassembly of the head with another article-forming receptacle therein for another article-forming cycle. The removed receptacle with the article therein may be exposed to a vulcanizing medium, such as hot water, and thereafter the article may be removed from the receptacle or the article first may be removed and then vulcanized on a separate form. In this manner the body of the article 40 becomes thoroughly bonded so as to become integral with the rubber of the bead 27.

Modifications of the invention may be resorted to without departing from the spirit thereof or the scope of the appended claims.

What is claimed is:

1. That method of making hollow rubber articles which method comprises providing a hollow receptacle having an article-reinforcing bead removably retained about the mouth of said receptacle, supplying a predetermined quantity of liquid rubber latex to said receptacle, rotating said receptacle about the vertical axis thereof, and while said receptacle is so rotated tilting it, thereby distributing said latex over the surface of the receptacle to form an open-mouthed article of definite wall thickness and causing the latex to flow into and become integrally united to said bead at the mouth of said article.

2. The method of making hollow rubber articles which method comprises providing a hollow receptacle having an article-reinforcing bead removably retained about the mouth of said receptacle, supplying a predetermined quantity of liquid rubber latex to said receptacle, rotating said receptacle about the vertical axis thereof, and while said receptacle is so rotated tilting it, thereby distributing said latex over the surface of the receptacle to form an open-mouthed article of definite wall thickness and permitting the latex to flow into and become integrally united to said bead at the mouth of said article, and heating said receptacle to dry the latex on the surface thereof while said article is being formed.

3. That method of making hollow rubber articles which method comprises providing a hollow receptacle having an article-reinforcing bead removably retained about the mouth of said receptacle, supplying a predetermined quantity of liquid rubber latex to said receptacle, rotating said receptacle about the vertical axis thereof, and while said receptacle is so rotated tilting it, thereby distributing said latex over the surface of the receptacle to form an open-mouthed article of definite wall thickness and causing the latex to flow into and become united to said bead at the mouth of said article, heating said receptacle to dry the latex on the surface thereof while said article is being formed, and vulcanizing said article so formed.

4. Apparatus for making thin rubber articles from latex or the like comprising a hollow receptacle having an opening therein, means for releasably retaining an annular article-reinforcing bead about the rim of said opening, means for rotating said receptacle about the vertical axis thereof, whereby latex may be supplied to said receptacle through said opening while the receptacle is rotated on its axis, and means for tilting said receptacle from the vertical position thereof as it is rotated, thereby to distribute said latex over the surface of the receptacle to form an article of desired wall thickness and having an opening therein, said latex flowing about the surface of said bead to become bonded thereto as the latex dries or sets.

5. Apparatus for making thin rubber articles from latex or the like comprising a hollow receptacle having an opening therein to receive a quantity of liquid latex, means for releasably retaining an annular article reinforcing bead about the rim of said opening, means for rotating said receptacle about the vertical axis thereof, means for tilting said receptacle from the vertical position thereof as it is rotated, thereby to distribute said latex over the surface of the receptacle to form an article of desired wall thickness and having an opening therein, said latex flowing about the surface of said bead to become bonded thereto as the latex dries or sets, and means for heating said receptacle to hasten drying said latex.

6. Apparatus of the character described comprising a support, a bracket pivotally mounted on said support to tilt about a horizontal axis, a hollow receptacle having an opening therein, a member mounted in said bracket to rotate about a vertical axis, releasable means for retaining said receptacle on said member, releasable means for retaining an annular reinforcing bead member at the rim of said receptacle, means for rotating said member carrying said receptacle about said vertical axis, and means for tilting said bracket about said horizontal axis while said member is rotated, thereby to distribute said latex over the interior surface of said receptacle to form an article of desired wall thickness, the wall of said article becoming integrally bonded to said bead member as the latex is set or dried to the form of said receptacle.

7. Apparatus of the character described comprising a support, a bracket pivotally mounted on said support to tilt about a horizontal axis, a hollow receptacle having an opening therein, a member mounted in said bracket to rotate about a vertical axis, releasable means for retaining said receptacle on said member, releasable means for retaining an annular reinforcing bead member at the rim of said receptacle, means for rotating said member carrying said receptacle about said vertical axis, means for tilting said bracket carrying said member and said receptacle about said horizontal axis while said member is rotated, thereby to distribute said latex over the interior surface of said receptacle to form an article of desired wall thickness, and means for heating said receptacle to hasten drying the latex as it is being formed into an article.

ISAAC W. ROBERTSON.